United States Patent [19]

Herrmann et al.

[11] 4,439,279

[45] Mar. 27, 1984

[54] METHOD FOR ELECTROCHEMICAL OXIDIZING TO THE PU (VI)

[75] Inventors: Fritz Herrmann, Hanau; Christian Ost, Mainaschaff, both of Fed. Rep. of Germany

[73] Assignee: Alkem GmbH, Hanau, Fed. Rep. of Germany

[21] Appl. No.: 165,543

[22] Filed: Jul. 3, 1980

[30] Foreign Application Priority Data

Jul. 18, 1979 [DE] Fed. Rep. of Germany ....... 2929122

[51] Int. Cl.$^3$ .............................................. C25B 1/00
[52] U.S. Cl. .................................................. 204/1.5
[58] Field of Search ...................................... 204/1.5

[56] References Cited

U.S. PATENT DOCUMENTS 3,672,848  6/1972  Mills et al. .......................... 204/1.5
4,235,740  11/1980  Druckenbrodt et al. ..... 252/301.1 R

FOREIGN PATENT DOCUMENTS 2016506  1/1972  Fed. Rep. of Germany.
2811959  9/1979  Fed. Rep. of Germany.
1301375  12/1972  United Kingdom.
1333978  10/1973  United Kingdom.

OTHER PUBLICATIONS

Peterson et al., "Chemistry in Nuclear Technology", pp. 168–172, Addison–Wesley Publ. Co. Inc., (1963), Reading, Mass.
Cleveland, "The Chemistry of Plutonium", pp. 56–58, Gordon and Breach Science Publishers, (1970), New York.

*Primary Examiner*—Edward A. Miller
*Attorney, Agent, or Firm*—Herbert L. Lerner; Laurence A. Greenberg

[57] ABSTRACT

Increasing the oxidation state of plutonium to Pu (VI) by circulating a starting solution of $U^6$ and $Pu^4$-nitrates and $HNO_3$ through an electrolysis cell at an electrode voltage of about 3 volts.

8 Claims, 3 Drawing Figures

METHOD FOR ELECTROCHEMICAL OXIDIZING TO THE PU (VI)

BACKGROUND OF THE INVENTION

1. Field of the Invention

The present invention relates to a method for electrochemically adjusting the plutonium in nitric acid solutions to the Pu (VI) oxidation state.

2. Description of the Prior Art

The need for adjusting the valence of plutonium is for the purpose of, for example, the common precipitation of plutonium with uranium as mixed isotope crystals, which then are converted through thermal dissociation into uranium/plutonium mixed oxides. Such mixed oxides have excellent solubility in nitric acid. In German Published Prosecuted Application No. 28 11 959, to which reference is expressly made, a method for producing mixed oxides has been set forth specifically. The method for adjusting the valence described there requires a fairly large amount of equipment so that the problem arose to achieve this valence adjustment of plutonium with simpler means.

SUMMARY OF THE INVENTION

With the foregoing and other subjects in view, there is provided in accordance with the invention a method for electrochemically treating Pu in nitric acid solutions which comprises circulating a starting solution of $U^6$ and $Pu^4$-nitrates and $HNO_3$ through an electrolysis cell at an electrode voltage at about 3 volts to increase the oxidation state to Pu (VI).

In one embodiment of the invention the electrolysis cell has an anode space and a cathode space separated by a diaphragm. The uranium/plutonium nitrate solution is conducted through the anode space and a 2 to 3 molar $HNO_3$ solution circulates through the cathode space. The electrolysis is operated at a temperature of about 70° C. with a current density at the anode of 20 to 100 mA/cm² and a current density at the cathode of 100 to 500 mA/cm².

In another embodiment in accordance with the invention, the electrolysis cell is without a diaphragm separating the anode and cathode spaces of the cell and an operating temperature of about 85° C. is maintained in the cell by cooling on the cathode side of the cell, and the cell is operated with current densities in the cathode area of about 100 mA/cm² and about 50 mA/cm² in the anode area.

In a preferred embodiment the anode rotates with a speed of rotation of 10 to 100 rpm, and the anode current density, at an operating temperature of about 70° C., is approximately 200 mA/cm².

Other features which are considered as characteristic for the invention are set forth in the appended claims.

Although the invention is illustrated and described herein as embodied in a method for electrochemical adjusting of the Pu (VI) oxidation stage, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

In a method in accordance with the invention, a starting solution of $U^{6+}/Pu^{4+}$-nitrate/$HNO_3$ is conducted in continuous circulation through an electrolysis cell at an electrode voltage of about 3 volts. In this method, the potential can be adjusted largely variably in the range above the Pu (VI) formation, depending on the current density conditions. This method may also be operated above the oxygen separation, and thereby the rate-determining step of the plutonium-oxygen formation is accelerated by an increased supply of atomic oxygen. The oxygen adsorption in the plutonyl formation is controlled by electro-catalytic effects. For this reason, the current density, the anode material and the hydrodynamic conditions in the cell are of importance, in addition to the potential. Through a suitable choice of the shape of the electrolysis cells with and without diaphragm, provision is made that cathode processes are pushed into the background and the redox equilibrium is on the side of the six-valent uranyl and plutonyl ions. This means ensures that no appreciable amounts of four-valent uranium are formed at the cathode which could reduce Pu (VI) and Pu (IV) present in the solution down to the trivalent state.

To explain this information in further detail, three variants of the method referring to FIGS. 1, 2 and 3 will now be described by way of examples.

Figure 1:
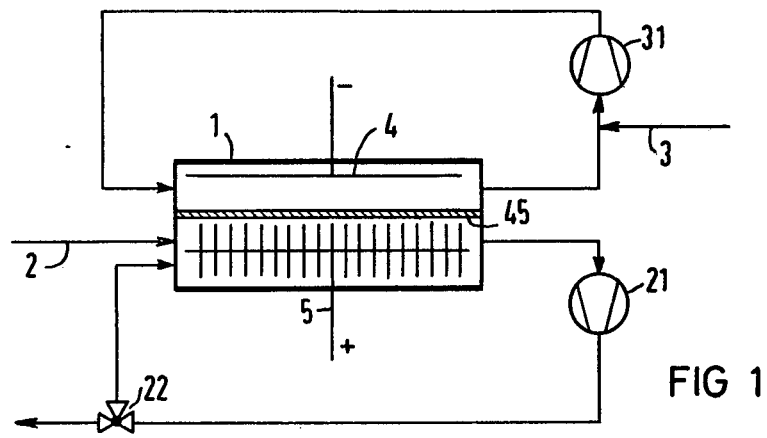
FIG. 1 diagrammatically illustrates apparatus for adjusting the valence of plutonium in nitric acid solution to plutonium (VI). An electrolysis cell is separated by a diaphragm into an anode space and a cathode space. A starting solution of $U^{6+}/Pu^{4+}$-nitrates/$HNO_3$ is conducted through the anode space and an $HNO_3$ solution circulates through the cathode space.

FIG. 1 schematically shows the implementation of the electrolysis method with an electrolysis cell 1 containing a diaphragm 45. This electrolysis cell is shown here, so to speak, in a top view. The cathode 4 has the shape of a disc, the anode 5, on the other hand, is built in the form of a rake with a multiplicity of individual discs pointing at the end face toward the diaphragm 45, and consists, for example, of platinum sponge or dimensionally stable material such as, for instance, Ti/PtO as the electrolytic catalyst. The cathode 4 consists, for example of platinum, graphite or vitreous carbon. As a result of the different shapes of the cathode and the anode, the anode area is substantially larger and therefore, has to accept less current density. On the one side of the electrolysis cell 1, the starting solution of $U^6/Pu^4$-nitrate/$HNO_3$ is introduced into the anode space through line 2 and is continuously circulated during the electrolysis process by means of the pump 21 and the three-way valve 22. The cathode space contains 2 to 3 molar $HNO_3$, which is likewise circulated continuously by the pump 31. The first feeding-in takes place via the line 3. Typical process data are a terminal voltage of 3 volts, a current density of 20 to 100 mA/cm$^2$ at the anode and of 100 to 500 mA/cm$^2$ at the cathode. At an operating temperature of about 70° C., the current yield for the plutonium (VI) formation is up to 70%. It should further be mentioned that the continuous addition of HNO$_3$ via the line 3 corresponds to the reaction of the protons at the electrode. The circulation of the electrolyte via the pump 21 is continued until the desired degree of oxidation is reached. The solution, which now contains U$^6$/Pu$^6$-nitrate and HNO$_3$, is then conducted away for further processing via the switched three-way valve 22.

Figure 2:
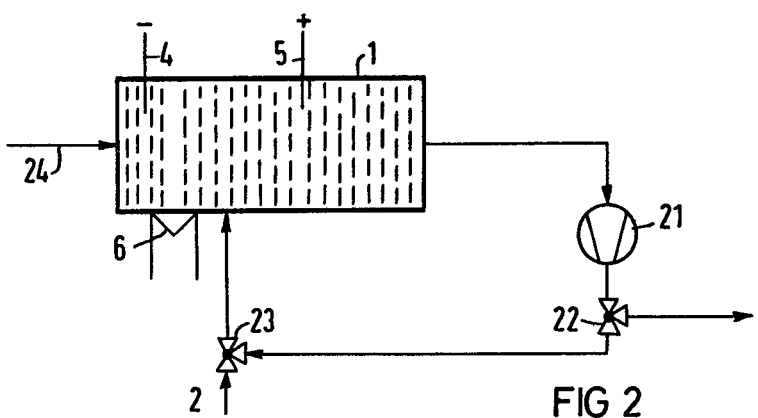
FIG. 2 diagrammatically illustrates a variant for adjusting the valence of plutonium in accordance with the invention, in which the electrolysis cell is without a diaphragm for separating the cathode space from the anode space, and in which the electrolysis cell is cooled on the cathode side.

In FIG. 2, a method is shown in which an electrolysis cell without diaphragm is used. The starting solution U$^6$/Pu$^4$-nitrate/NHO$_3$ is fed to the electrolysis cell 1 through the line 2 and the three-way valve 23 and similarly HNO$_3$ is fed-in on the cathode side via the line 24. Here, too, circulation takes place by means of the pump 21. The oxidized solution is taken off via the three-way valve 22. The electrodes 4 and 5 may be constructed as in FIG. 1; however, they can also be employed as a fluid-bed electrode, since the latter has a substantially larger specific surface. The electrodes 4 and 5 can be separated by a bed of insulating material. The operating temperature in the electrolysis cell 1 is then about 85° C. A cooling device 6 which may be any suitable device for removing heat, as for example a jacket through which cooling water flows, surrounding the cathode space, is employed for removing the larger amount of Joule heat in the cathode space.

Figure 3:
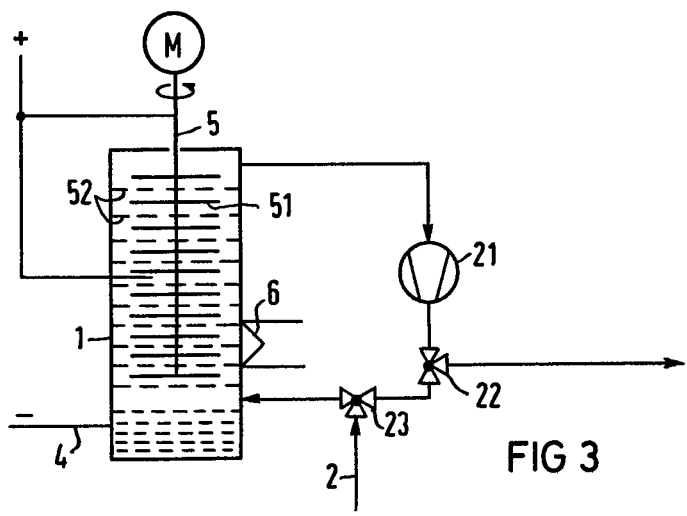
FIG. 3 diagrammatically illustrates another variant in which the electrolysis cell has a rotating anode with spaced horizontal electrode discs attached to a vertical shaft.

FIG. 3 shows a process in which a rotating anode 5 within the electrolysis cell 1 is used. The rotating anode, which has a speed of rotation of 10 to 100 revolutions per minute, has a vertical shaft to which spaced electrode discs 51 are attached. Flow baffles or turbulence devices 52 are arranged between the spaced electrode discs 51. Devices 52 are connected to the wall of the cell 1 in a conducting manner, and are likewise connected to the positive pole of the current source. Here, too, a cooling device 6 for regulating the temperature in the electrolysis cell 1 is provided. The current density at the anode reached with this process is 200 mA/cm$^2$, with an electrolysis voltage of about 3 volts, and an operating temperature of 70° C. Current yields for the Pu (VI) formation of about 85% are obtained.

These three examples show that the method according to the invention permits variations; they therefore make no claim for completeness. For these methods, however, it is important that the electrolytes are continuously circulated and that provision is made for good mixing. The end product of an uranium-plutonium solution obtained thereby with the same valence of the heavy metals makes it possible to process the solution further without difficulty into mixed oxides in accordance with known methods. These mixed oxides exhibit excellent solubility in nitric acid, which is a condition for the later good reprocessability and reuse of the extracted metals.

We claim:

1. Method for electrochemically treating Pu in nitric acid solutions containing U$^6$ to increase the Pu to the six-valent state without forming quadri-valent uranium which comprises circulating a starting solution of U$^6$ and Pu$^4$-nitrates and HNO$_3$ through an electrolysis cell at an electrode voltage of about 3 volts to increase the oxidation state to Pu (VI).

2. Method according to claim 1 wherein the electrolysis cell has an anode space and a cathode space separated by a diaphragm, and wherein the uranium/-plutonium nitrate solution is conducted through the anode space and a 2 to 3 molar HNO$_3$ solution circulates through the cathode space and wherein the electrolysis is operated at a temperature of about 70° C. with a current density at the anode of 20 to 100 mA/cm$^2$ and a current density at the cathode of 100 to 500 mA/cm$^2$.

3. Method according to claim 2, wherein the diaphragm is a member of the group consisting of ceramic and an ion exchanger, the anode of the cell is a dimensionally stable material, and the cathode is a member of the group consisting of graphite and vitreous carbon.

4. Method according to claim 3, wherein the dimensionally stable material is a member of the group consisting of platinum sponge and titanium PtO.

5. Method according to claim 1, wherein said electrolysis cell is without a diaphragm separating the anode and cathode spaces of the cell and wherein an operating temperature of about 85° C. is maintained in the cell by cooling on the cathode side of the cell, and wherein the cell is operated with current densities in the cathode area of about 100 mA/cm$^2$ and about 50 mA/cm$^2$ in the anode area.

6. Method according to claim 1, wherein the anode rotates with a speed of rotation of 10 to 100 rpm, and wherein the anode current density, at an operating temperature of about 70° C., is approximately 200 mA/cm$^2$.

7. Method according to claim 2, wherein the anode rotates with a speed of rotation of 10 to 100 rpm, and wherein the anode current density, at an operating temperature of about 70° C., is approximately 200 mA/cm$^2$.

8. Method according to claim 5, wherein the anode rotates with a speed of rotation of 10 to 100 rpm, and wherein the anode current density, at an operating temperature of about 70° C., is approximately 200 mA/cm$^2$.

* * * * *